(No Model.)
L. T. WEISS.
SPEED MEASURE.
No. 505,582. Patented Sept. 26, 1893.
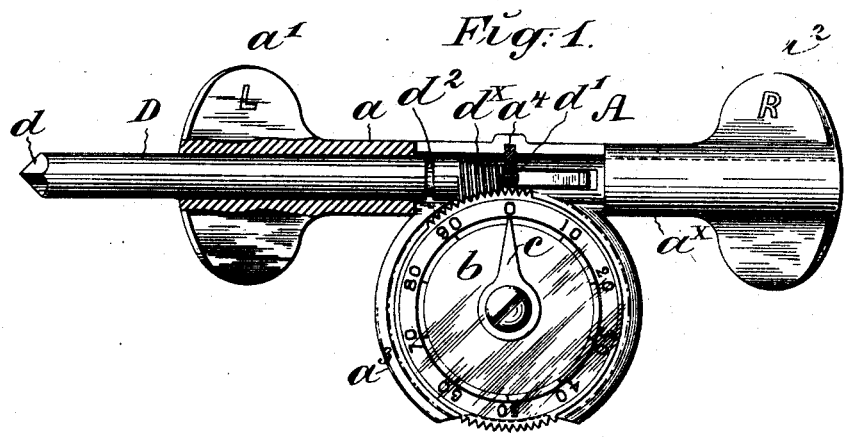
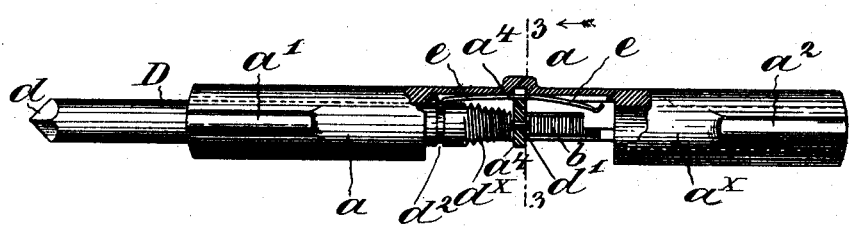
Witnesses:
Peter A. Ross
Herbert Blossom.
Inventor:
Louis T. Weiss
by Henry Connett
his Attorney

UNITED STATES PATENT OFFICE.

LOUIS T. WEISS, OF BROOKLYN, NEW YORK.

SPEED-MEASURE.

SPECIFICATION forming part of Letters Patent No. 505,582, dated September 26, 1893.

Application filed December 12, 1892. Serial No. 454,822. (No model.)

*To all whom it may concern:*

Be it known that I, LOUIS T. WEISS, a citizen of the United States, and a resident of the city of Brooklyn, in the county of Kings and State of New York, have invented certain new and useful Improvements in Speed-Indicators, of which the following is a specification.

My invention relates to the class of devices known as speed indicators or revolution counters, comprising, ordinarily, a spindle with an angular point to be pressed against the end of a rotating shaft, said spindle being mounted rotatively in a casing and having on it a screw thread or worm to engage the teeth of a graduated worm wheel.

The main purpose of my present invention is to provide such an indicator with a removable and reversible spindle, whereby the indicator may be so set that the graduated worm wheel will be driven in the proper direction whatever may be the direction of rotation of the shaft to which it is applied.

In the accompanying drawings which serve to illustrate the invention—Figure 1 is a side view partly in section, of a speed indicator embodying my improvements. Fig. 2 is a plan view of the same, partly in section. Fig. 3 is a transverse section in the plane of the line 3, 3, in Fig. 2.

A represents, as a whole, the metal frame or casing in which the operative parts have bearings. This frame comprises two like tubular sockets, $a$ and $a^x$, two handles or grips, $a'$ and $a^2$, at the outer extremities of the respective sockets and forming parts of the same, and a case, $a^3$, at the middle part, to receive the graduated worm wheel, $b$. This wheel may be of the usual kind, rotatively mounted in the case $a^3$, on a stud which rises in the center of the case, and on said stud will be fixed a pointer or hand, $c$, also of the usual kind.

D is the spindle, provided with the usual angular point, $d$, and furnished with a screw or worm $d^x$, of conical form, at its other end, to engage the teeth of the worm wheel $b$, when the spindle is in place.

In Fig. 1 I have shown the socket $a$, at the left, in which the spindle is mounted, in longitudinal section. The spindle may be inserted in either of the sockets, $a$ or $a^x$, according to the direction the shaft to which it is to be applied is rotating, the object being to drive the worm wheel $b$ always in one direction.

When the spindle is pushed into either socket, a small centering pin, $d'$, on its extremity enters a corresponding hole in an abutment plate, $a^4$, fixed in the frame A opposite the center of the worm wheel $b$. This plate, which may be cast in place in the frame, serves to receive and resist the pressure when the spindle is pressed against the end of the shaft.

The spindle is held in place so that it cannot fall out, by the engagement of a spring, $e$, set in the hollow of the frame, with a shoulder formed by circumferential groove, $d^2$, in the spindle as clearly shown in Fig. 2. This spring snaps into the groove when the spindle is pushed into the socket and holds the spindle against falling out, but it will not prevent the spindle from being drawn out. The spring $e$ is in the form of a bow, secured at its middle to the frame; the upturned ends thereof serve, respectively, to engage the groove $d^2$, in whichever socket the spindle may be inserted. Two springs, one for each socket, might be employed, but for economy I employ one bow-shaped spring and secure it at the middle by means of the abutment plate $a^4$, which has in its edge a notch to receive the body of the spring, as clearly shown in Fig. 2 where the central part of the frame is broken away to show the manner of fixing the spring in place. Fig. 3 also shows the construction.

The operation is simple; the user presents the tip of the spindle to the rotating shaft and notes the direction in which the worm wheel rotates; if it rotates backward, or in the direction contrary to that in which the graduations are properly indicated by the pointer, he draws out the spindle and inserts it in the other socket. The threaded extremity of the spindle is made conical so that the worm wheel may engage a considerable number of the threads simultaneously.

I have shown the two sockets for the spindle aligned axially, and this is the most convenient arrangement, but it will be obvious to any one skilled in the art that they need not be aligned in this way.

In order to enable the worm wheel $b$ to be turned conveniently with the thumb, in setting the wheel to zero when the spindle is out of its socket, the case $a^3$, in which the wheel $b$ is mounted is cut away at $a^4$. By turning the wheel with the thumb in one direction, the spindle will be displaced by the rotation of the wheel, and after setting the wheel to zero the spindle can be again replaced.

Having thus described my invention, I claim—

1. A speed indicator having two sockets for the spindle, a graduated worm wheel and pointer, a spindle D, provided with a screw at one extremity to engage the teeth of the worm wheel, and means for holding the spindle in place when inserted, whereby the spindle may be withdrawn from one socket, reversed, and inserted in the other socket, as set forth.

2. The combination in a speed indicator, of the frame having two aligned sockets, $a$ and $a^x$, for the spindle, the said spindle, having a screw at one extremity to engage and drive the worm wheel, the said worm wheel and its pointer, and a spring, mounted in the frame and adapted to yieldingly engage a shoulder on the spindle when the latter is in position in its socket, substantially as set forth.

3. In a speed indicator the combination with the frame having two aligned sockets for the spindle and an abutment, $a^4$, therefor, of the spindle, provided with a screw at one end to engage the worm wheel, the said worm wheel and its pointer, and means for holding the spindle in place in its socket when inserted, substantially as set forth.

4. In a speed indicator, the combination with the frame, having two handles and two axially aligned sockets which pass through the respective handles, of the plate $a^4$, set in the frame opposite the axis of the worm wheel, the said worm wheel and its pointer, the spindle, and a spring, $e$, secured to the frame at the said plate, one of the upturned ends of said spring being adapted to engage a shoulder on the spindle when the latter is in place in either one of the sockets, substantially as set forth.

In witness whereof I have hereunto signed my name in the presence of two subscribing witnesses.

LOUIS T. WEISS.

Witnesses:
HENRY CONNETT,
PETER A. ROSS.